(12) United States Patent  
Butler, Sr.

(10) Patent No.: US 6,427,347 B1  
(45) Date of Patent: Aug. 6, 2002

(54) LINE TRANSFER INSTRUMENT

(76) Inventor: Roy Butler, Sr., 300 Cedarcrest Dr., Lexington, SC (US) 29072

( * ) Notice: Subject to any disclaimer, the term of this patent is extended or adjusted under 35 U.S.C. 154(b) by 0 days.

(21) Appl. No.: 09/488,338

(22) Filed: Jan. 20, 2000

Related U.S. Application Data

(60) Provisional application No. 60/116,745, filed on Jan. 22, 1999.

(51) Int. Cl.[7] ................... G01B 11/27; G01C 15/00
(52) U.S. Cl. ............... 33/286; 33/290; 33/DIG. 21
(58) Field of Search .................. 33/286, 281, 282, 33/283, 285, 290, 291, 292, DIG. 21, 412, 529, 227, 228

(56) References Cited

U.S. PATENT DOCUMENTS

| | | | | |
|---|---|---|---|---|
| 3,116,557 A | * | 1/1964 | Trice, Jr. ................ | 33/228 |
| 4,681,439 A | * | 7/1987 | Shoemaker ............. | 33/286 |
| 4,825,258 A | * | 4/1989 | Whitson ................. | 33/286 |
| 4,926,563 A | * | 5/1990 | Smith ..................... | 33/286 |
| 4,988,192 A | * | 1/1991 | Knittel ................... | 33/281 |
| 5,159,760 A | * | 11/1992 | Spiegel et al. ........... | 33/292 |
| 5,465,493 A | * | 11/1995 | Sobottke et al. ......... | 33/286 |
| 5,983,510 A | * | 11/1999 | Wu et al. ................ | 33/286 |
| 6,138,367 A | * | 10/2000 | Raby ...................... | 33/290 |

* cited by examiner

Primary Examiner—Christopher W. Fulton  
(74) Attorney, Agent, or Firm—Michael A Mann; Timothy J Slabouz; Nexsen Pruet Jacobs & Pollard LLC

(57) ABSTRACT

A line transfer instrument and method for aligning a pipe laser's laser beam are disclosed wherein the instrument includes a base, a self-leveling scope rotatably mounted to the base so that it is capable of looking downward and slightly backward, a horizontal dove-tail slide for horizontally translating the base perpendicular to the line of sight, and a spotting laser for illuminating the pipe laser so that the scope can be centered more easily on it. The method includes positioning the scope over the pipe laser using the spotting laser and slide to illuminate the center of the pipe laser and center the scope over the pipe laser.

17 Claims, 3 Drawing Sheets

LINE TRANSFER INSTRUMENT

PRIORITY CLAIM

The inventor claims the priority benefit of the filing date of U.S. Provisional Patent application Ser. No. 60/116,745, filed Jan. 22, 1999, and which is incorporated herein by reference.

BACKGROUND OF THE INVENTION

1. Field of the Invention

The present invention relates generally to construction techniques and to line transfer instruments and their use in particular.

2. Discussion of Background

Accuracy in construction of buildings, walls, highways and drains is an important goal. However, two factors tend to operate to reduce accuracy in construction: the construction environment and time. Construction by and large takes place out of doors, in the elements, and on terrain that may not make it easy to be accurate with measurements. Furthermore, construction jobs are often competitively bid and required to meet a schedule; therefore, time cannot be wasted, or if the job falls behind schedule, time must be made up.

An important part of construction is setting a line, that is, establishing a direction in three dimensional space to guide construction. The line may be used to determine the direction in which a pipeline is to be laid, for example, or the location where certain structures will be built. The line transfer instrument is a common piece of equipment used in construction to set a line. A typical line transfer instrument is a sighting device, or simply a "scope", mounted on a tripod or base. In laying pipe, for example, it will be used in cooperation with a pipe laser. The purpose of the pipe laser is to establish a beam of light down the center of the pipe as each section is added to it. Each section of pipe is centered on the beam using a target temporarily placed over the end of the pipe. If the laser beam shines on the center of the target, that pipe section is aligned with the preceding sections. However, the line transfer instrument is used to set the direction of the pipe laser so that it is pointing in the correct direction.

To set the pipe laser in the case of a sewage or drainage pipe, a manhole is put into position and the pipe laser is lowered into it. Perhaps one or two sections of pipe are connected to the manhole that run in the general direction the pipe line is to go. The line transfer instrument with its tripod is placed on top of the manhole and centered by eye over the pipe laser and leveled. The centering of the line transfer instrument over the pipe laser is then refined using a plumb bob. Usually an assistant is sent into the manhole to limit the swinging of the bob. If the line transfer instrument is not centered, screws holding it to the tripod are loosened so it can be moved laterally and retightened. When centered, the line transfer instrument is directed at the distant marker, which indicates where the pipe line should be directed. Then the scope of the instrument is angled downward until it is looking at the laser light emitted by the pipe laser. If the pipe laser is not pointing its beam of light in the correct direction, it is redirected. In the case of many pipe lasers, redirection can be done using a remote control device.

This process is not as simple as it sounds. The tripod is perched somewhat precariously on top of the manhole where the opening is not centered over the center of the floor of the manhole, where the pipe laser is located. Sometimes the center of the pipe laser cannot be seen or is difficult to see at the bottom of a dark manhole. The plumb bob, especially if it hangs from a long wire, will swing interminably and at the least disturbance. Shifting the transit requires releveling the transit and waiting for the plumb bob to stop. Meanwhile the weather may be cold, windy and rainy.

There remains a need for a line transfer instrument that is easier and quicker to use.

SUMMARY OF THE INVENTION

According to its major aspects and briefly recited, the present invention is a builder's level transit having a self-leveling sighting device or scope capable of being rotated over a wide arc, including several degrees of arc past vertically downward, and a base for the sighting device carrying means for controlled translational movement of the sighting device horizontally, perpendicular to the optical axis of the scope. Preferably, the scope also carries a laser spotter that can be used to illuminate the surface of the pipe laser in the manhole to help with focusing on the scope when centering the line transfer instrument. A small, relatively wide angle spotting telescope is mounted to the top of the scope of the line transfer instrument to make it easier to set up the device initially. In addition and optionally, the scope is held in place by a radial arm clampable to a manhole rather than a tripod.

To shoot a line, the radial arm is clamped to the manhole and leveled. Using the spotting telescope, the user sights on the distant marker and then uses it and the laser spotter to look down at the pipe laser. If the line transfer instrument is within a few inches of being centered on the pipe laser, the user will redirect the scope at the distant marker and sight it between the cross hairs of the scope and lock that azimuthal position in with a position lock on the base so that the scope cannot rotate about a horizontal plane.

The user will then rotate the scope back down at the pipe laser, about a vertical plane, and translate the scope laterally until the center of the pipe laser is in the cross hairs of the scope. Next, the user will sight on the pipe laser's laser light where it emerges from the end of the pipe laser and, using the remote pipe laser rotating control, turn the pipe laser until its laser light beam is aligned with the cross hairs of the scope. The pipe laser is then pointing in the right direction. As long as the laser light from the pipe laser hits a target centered in the sections of pipe added, the run of pipe will be following the line established to the distant point.

The ability to translate the scope laterally without moving the base is a major advantage of the present invention. Because it can be moved laterally without loosening it from its base and releveling it and resighting on the distant point, the user is able to align the pipe laser with the distant target much faster.

Another important feature of the present invention is the combination of the scope that can be directed a few degrees past straight down and the laser pointer it carries. This combination allows the user to see the center of the pipe laser in the manhole from the scope more quickly because the laser spotter illuminates the pipe laser's otherwise dark surface.

Another feature of the present invention is that the scope optics allow focusing at a much closer range than conventional line transfer instrument scopes. In finding the center of the pipe laser in the manhole, having the magnification of the scope and the ability of the scope to focus on the surface of the laser allows the cross hairs of the scope to be more quickly and accurately brought in line with the center of the laser than by using a plumb bob.

Other features and their advantages will be apparent to those skilled in the art of level transits from a careful reading of the Detailed Description of Preferred Embodiments accompanied by the following drawings.

DETAILED DESCRIPTION OF PREFERRED EMBODIMENTS

The present invention is an improved line transfer instrument and method for using it. It works especially well when mounted on a manhole tower clamp but may also be used on a conventional tripod.

Figure 1:
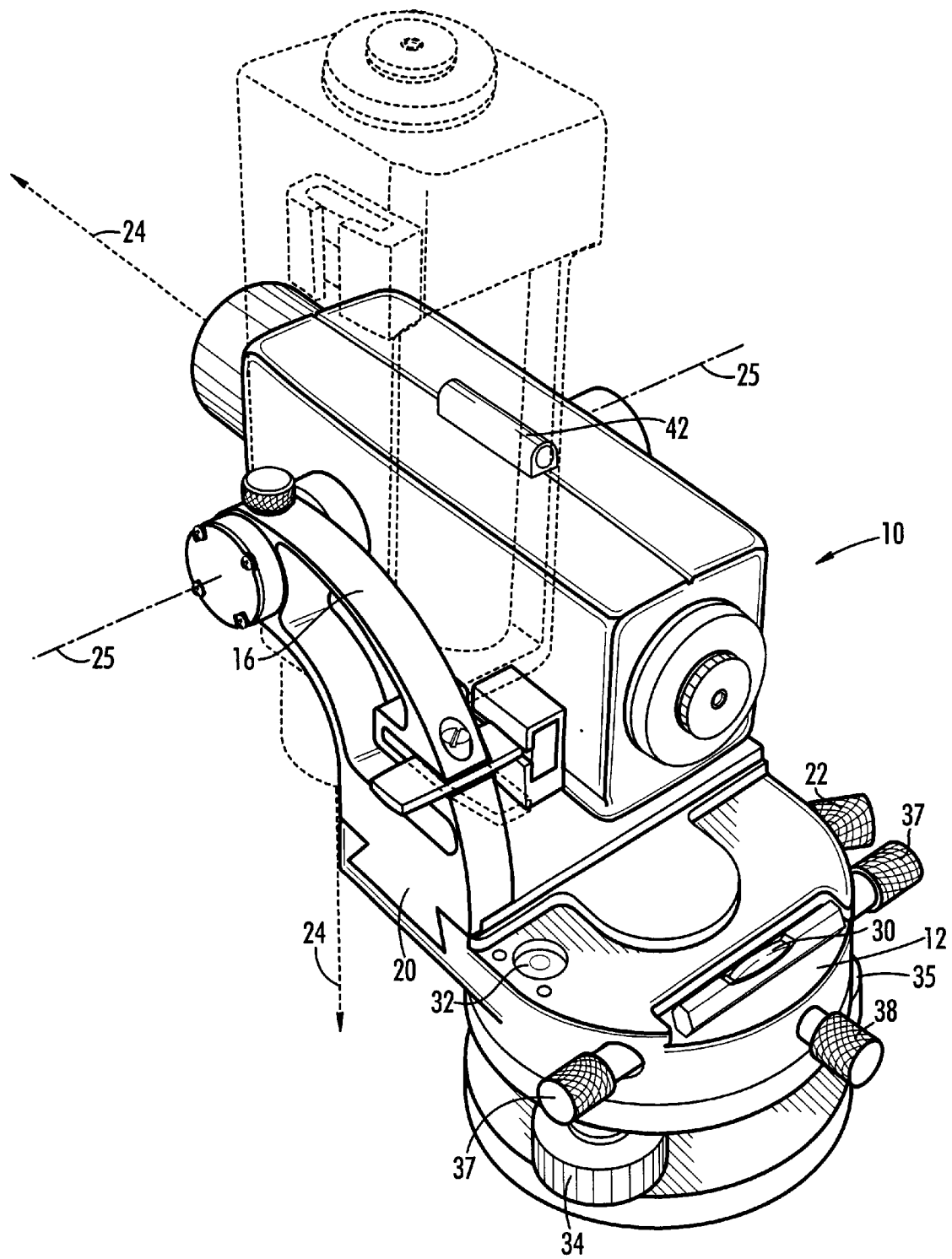
FIG. 1 is a side view of a line transfer instrument according to a preferred embodiment of the present invention with the scope rotated downward.
Figure 2:
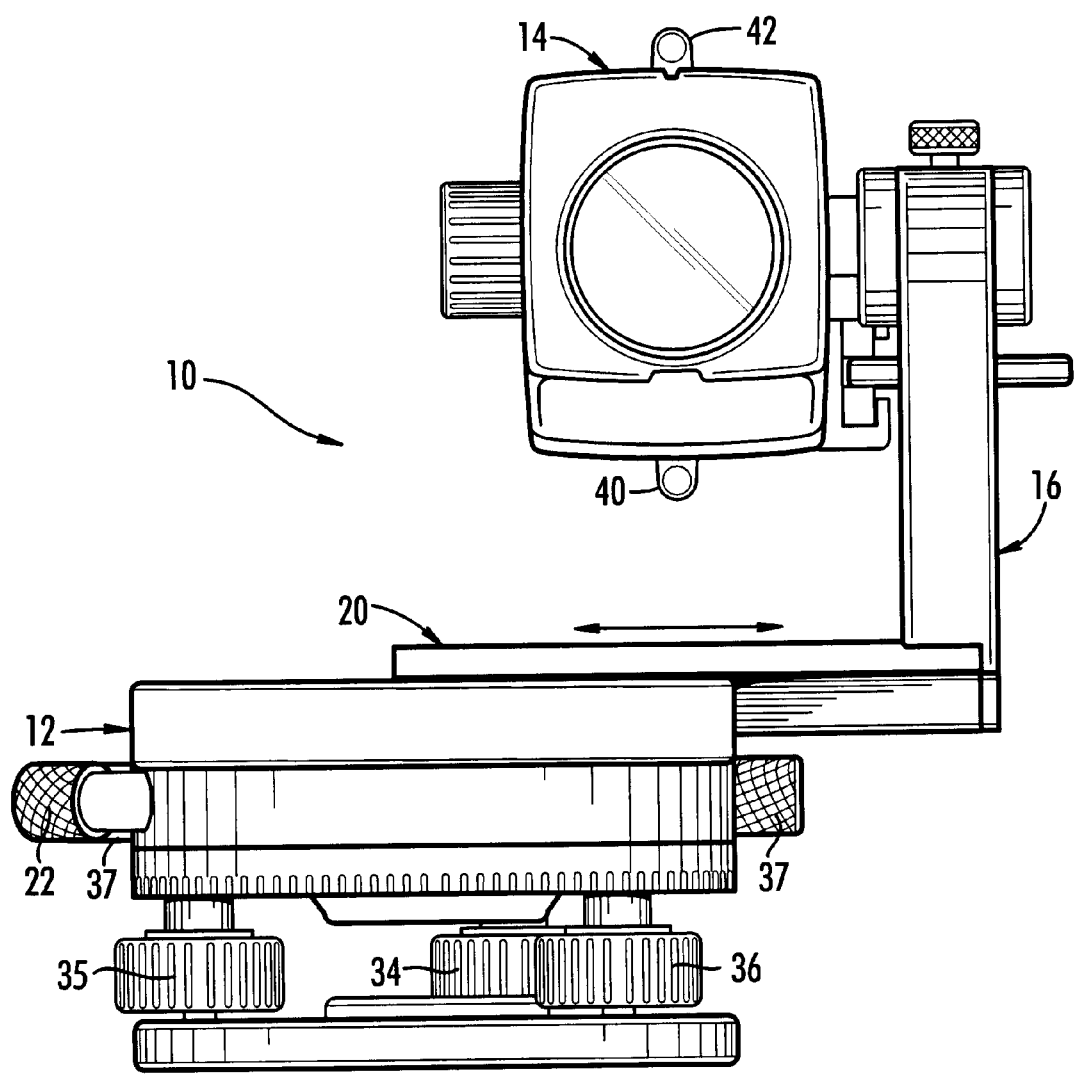
FIG. 2 is a front view of the line transfer instrument of FIG. 1 with the scope shown translated to the right.
Figure 3:
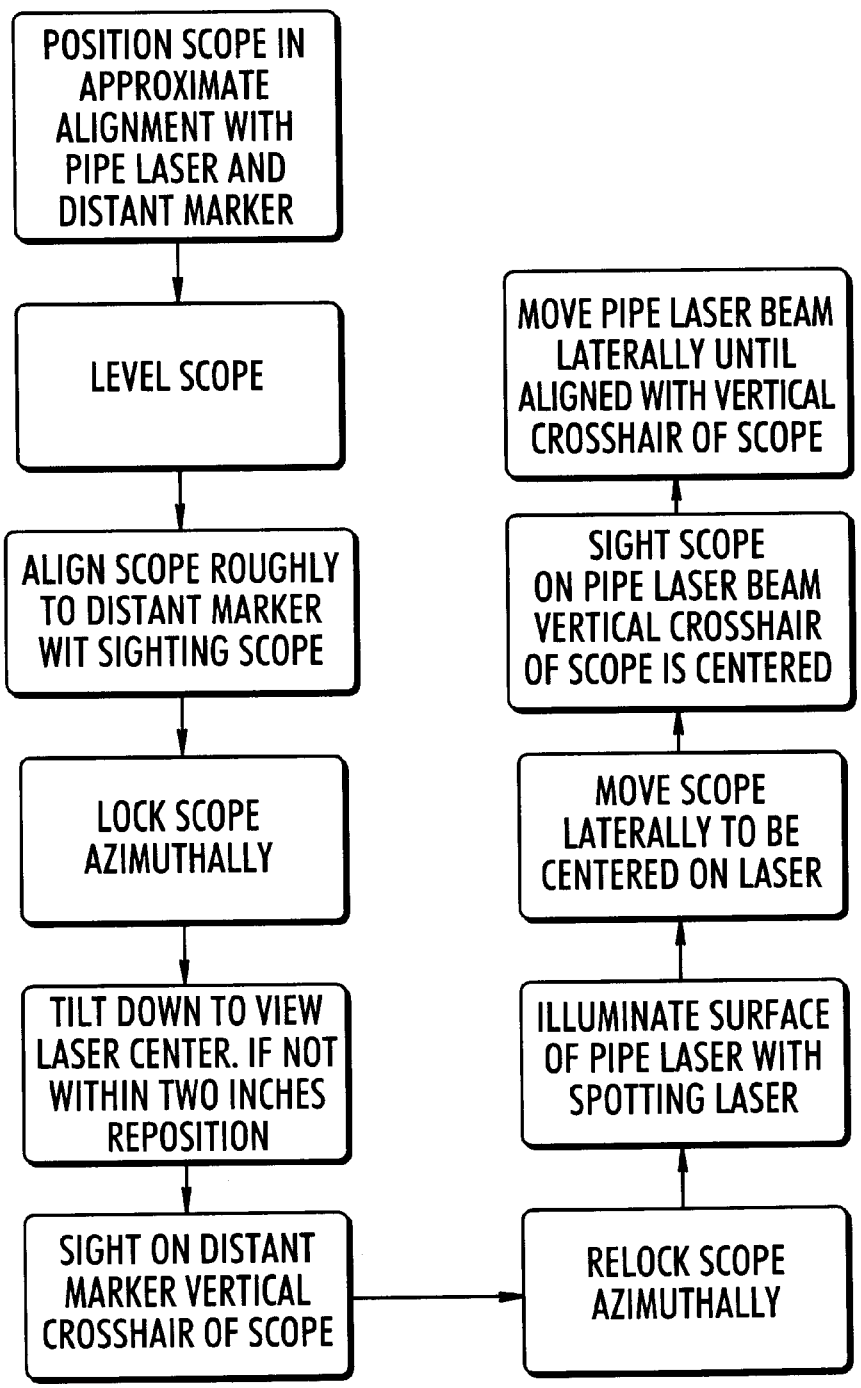
FIG. 3 is a flow diagram of the method of using a line transfer instrument of FIG. 1 according to a preferred embodiment of the present method.

Referring now to FIGS. 1 and 2, there is shown a line transfer instrument 10 according to a preferred embodiment of the present invention. The line transfer instrument 10 comprises a base 12, a sighting device or scope 14, and an arm 16 for fastening scope 14 to base 12 in a manner that allows translational movement of scope 14 along the line transfer instrument's horizontal axis 25.

Base 12 includes a dove-tail lateral slide 20 and a control 22 for translating base 12 with respect to slide 20. Slide 20 moves in a direction exactly perpendicular to the optical axis 24 of scope 14, carrying scope 14 with it. Base 12 has two levels: a cross level 30 and a bulls eye level 32. These are both conventional bubble-sight leveling devices, and the level of base 12 is adjusted by turning screws 34, 35, and 36, on base 12. Knob 37 changes the azimuthal angle; knob 38 locks the upper part of base 12 with respect to the lower part so that scope 14 will not rotate azimuthally.

The scope 14 is self-leveling and has magnification capability of between 24 and 32 power, preferably 28 power. Self-leveling of optical surveying and construction instruments is well known in the prior art. For example, a good description of the self-leveling prior art is contained in U.S. Pat. No. 3,936,197 issued to Aldrink et al., and even though this Patent discusses self-leveling from the perspective of projecting a beam of laser light the principles are nonetheless generally applicable to the self-leveling of any optical devices. The scope 14 is mounted to arm 16, and arm 16 is in turn adapted to hold scope 14 forward far enough so that scope 14 can rotate about a horizontal axis 25 perpendicular to the line of sight through an arc that includes at least a few degrees, preferably approximately three degrees, past vertically downward so that scope 14 is capable of looking not only downward but slightly backward. This range of motion will enable the user to see the pipe laser when that pipe laser is placed in a manhole and instrument 10 is mounted on top of the manhole.

Scope 14 preferably carries a spotting laser 40 on its bottom in a line parallel to the scope's optical axis 24. Spotting laser 40 is different from the pipe laser positioned in the manhole for shooting a beam down the center of the pipe. Spotting laser 40 is used to center scope 14 on the pipe laser.

In a dark manhole where there may be several surfaces at various elevations, it is usually not easy to see the pipe laser or to find the specific spot marked on it that the scope must be centered on. A spotting laser provides some illumination and, when directed onto a portion of the pipe laser's surface, identifies a place on that surface to use to focus scope 14. Once focused on the pipe laser surface, finding the center of the pipe laser, which is a mark on the top of the pipe laser housing that identifies the vertical axis about which the pipe laser pivots, is much easier and faster. The magnification of the scope 14 when focused on this spot also makes it easier to align scope 14 than when using a conventional plumb bob or a scope with no magnification.

Using lateral slide 20, scope 14 can be moved laterally until the cross hairs of scope 14 are aligned with the center of the pipe laser. There is no need to loosen instrument 10 and reposition it, then secure it and relevel it and sight on the distant marker. Once scope 14 is centered on the pipe laser, the pipe laser is rotated about that vertical axis until the laser light is in line with the line that runs between the center of the pipe laser and the distant marker. Preferably, instrument 10 also carries a wide angle positioning scope 42 on top of scope 14 for aiming the scope in the general direction desired.

In use, instrument 10 is mounted to a tripod or tower clamp and positioned by eye over the pipe laser in the manhole. The user sights on the distant marker with positioning scope 42 and locks instrument 10 onto that position. Then the user rotates scope 14 downward and, again using the positioning scope 42, determines if scope 14 is within two inches of being directly over the center of the pipe laser. If scope 14 is generally centered, then the user will sight carefully on the distant marker, bringing its image within the cross hairs of scope 14 and locking instrument 10 down so that it will not rotate azimuthally and noting the azimuthal angle. Again rotating instrument 10 down toward the pipe laser and using spotting laser 40 to illuminate a portion of the surface of the pipe laser, the user will focus on the illuminated surface and then translate scope 14 laterally using slide 20 to bring the pipe laser center within the cross hairs of the scope. Once centered, the user will sight on the emerging laser light beam from the end of the pipe and, using the remote control for the pipe laser that causes it to rotate, bring the laser beam into alignment with the cross hairs of scope 14. Then the pipe laser is properly aligned with the distant marker.

It will be readily apparent to those skilled in the art of line transfer instrument from reading the foregoing that many substitutions and modifications may be made to the preferred embodiments described without departing from the spirit and scope of the present invention.

What is claimed is:

1. A method for sighting a beam from a pipe laser on a distant marker using a scope, said method comprising the steps of:

positioning a scope over a pipe laser;

leveling said scope;

sighting said scope on a distant marker;

locking said scope to prevent horizontal rotation thereof;

sighting said scope on said pipe laser to center said scope on said laser;

sighting said scope on a beam of laser light from said pipe laser; and rotating said beam of laser light of said pipe laser until said laser light is aligned with said scope.

2. The method as recited in claim 1, wherein said scope has a line of sight and further comprising the step of translating said scope perpendicular to said line of sight until said scope is centered over said pipe laser.

3. The method as recited in claim 1, further comprising the steps of:

illuminating a surface of said pipe laser; and focusing said scope on said illuminated surface so that said surface of said pipe laser can be seen in order to position said scope over said laser.

4. The method as recited in claim 1, wherein said scope includes a spotting laser and further comprising the steps of:

directing said spotting laser on a surface of said pipe laser to illuminate said surface; and focusing said scope on said illuminated surface so that said surface of said pipe laser can be seen in order to center said scope over said laser.

5. The method as recited in claim 1, wherein said scope includes a positioning scope and wherein said method further comprises the step of sighting on said distant marker before said positioning step.

6. The method as recited in claim 1, wherein said scope is centered over a center marker of said pipe laser to center said scope.

7. An apparatus for sighting a beam from a pipe laser on a distant marker, said apparatus comprising:

a base;

an arm slidably connected to said base;

a scope rotatably mounted to said arm forward of said base so that said scope can rotate past vertically downward and be sighted on an object below said base, said scope having an optical axis; and means for illuminating at least a portion of the surface of a pipe laser.

8. The apparatus as recited in claim 7, further comprising a spotting laser carried by said base so that said spotting laser is parallel to said optical axis of said scope.

9. The apparatus as recited in claim 7, wherein said base further comprises means for translating said scope with respect to said base.

10. The apparatus as recited in claim 9, wherein said translating means is adapted to translate said scope perpendicular to said optical axis of said scope.

11. The apparatus as recited in claim 7, further comprising a positioning scope carried by said base.

12. An apparatus for sighting a beam from a pipe laser on a distant marker, said apparatus comprising:

a base;

an arm slidably connected to said base;

a scope rotatably mounted to said arm forward of said base so that said scope can rotate past vertically downward and be sighted on an object below said base, said scope having an optical axis;

means for illuminating an object at which said scope is directed; and means for translating said scope with respect to said base.

13. The apparatus as recited in claim 12, wherein said illuminating means is a spotting laser mounted to said base and aligned with said optical axis of said scope.

14. The apparatus as recited in claim 12, further comprising a positioning scope carried by said scope.

15. The apparatus as recited in claim 12, wherein said translating means translates said scope perpendicular to said optical axis.

16. The apparatus as recited in claim 12, wherein said arm permits said scope to rotate approximately three degrees past vertically downward.

17. The apparatus as recited in claim 12, wherein said translating means is a dovetailed lateral slide.

* * * * *